United States Patent
Krammer et al.

(10) Patent No.: US 6,981,841 B2
(45) Date of Patent: Jan. 3, 2006

(54) TRIPLE CIRCUIT TURBINE COOLING

(75) Inventors: Erich Alois Krammer, West Chester, OH (US); Richard Clay Haubert, Hamilton, OH (US); Ching-Pang Lee, Cincinnati, OH (US); Harvey Michael Maclin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 134 days.

(21) Appl. No.: 10/718,149

(22) Filed: Nov. 20, 2003

(65) Prior Publication Data

US 2005/0111964 A1 May 26, 2005

(51) Int. Cl.
*F03D 11/00* (2006.01)

(52) U.S. Cl. .................... 415/115; 416/916 R; 416/60; 416/806

(58) Field of Classification Search ................ 415/115, 415/116; 416/90 R, 97, 92, 96 R; 60/226.1, 60/785, 806
See application file for complete search history.

(56) References Cited

U.S. PATENT DOCUMENTS

| | | | |
|---|---|---|---|
| 3,034,298 A | 5/1962 | White | 60/726 |
| 4,080,785 A | 3/1978 | Koff et al. | 60/226.3 |
| 4,741,153 A | 5/1988 | Hallinger et al. | 60/806 |
| 5,134,844 A * | 8/1992 | Lee et al. | 60/806 |
| 5,135,354 A | 8/1992 | Novotny | 415/115 |
| 5,232,339 A | 8/1993 | Plemmons et al. | 415/178 |
| 5,472,313 A | 12/1995 | Quinones et al. | 415/115 |
| 5,555,721 A | 9/1996 | Bourneuf et al. | 60/806 |
| 5,996,331 A | 12/1999 | Palmer | 60/782 |
| 6,050,079 A | 4/2000 | Durgin et al. | 60/782 |
| 6,183,193 B1 | 2/2001 | Glasspoole et al. | 415/115 |
| 6,487,863 B1 * | 12/2002 | Chen et al. | 60/782 |

FOREIGN PATENT DOCUMENTS

| | | |
|---|---|---|
| EP | 0469784 | 2/1992 |
| EP | 1088963 | 4/2001 |

OTHER PUBLICATIONS

Traeger, "Aircraft Gas Turbine Engine Technology," 2d Ed., 1979, pp: i, ii, 480–493.
CFM International, "CFM56-3 Engine Airflow," Engine in public use and on sale in U.S. more than one year before Oct. 1, 2003, one page color drawing.

* cited by examiner

*Primary Examiner*—Edward K. Look
*Assistant Examiner*—Dwayne J. White
(74) *Attorney, Agent, or Firm*—William S. Andes; Francis L. Conte

(57) ABSTRACT

A turbofan engine includes in serial flow communication a first fan, second fan, multistage compressor, combustor, first turbine, second turbine, and third turbine. The first turbine is joined to the compressor by a first shaft. The second turbine is joined to the second fan by a second shaft. And, the third turbine is joined to the first fan by a third shaft. First, second, and third cooling circuits are joined to different stages of the compressor for cooling the forward and aft sides and center bore of the first turbine with different pressure air.

20 Claims, 3 Drawing Sheets

TRIPLE CIRCUIT TURBINE COOLING

BACKGROUND OF THE INVENTION

The present invention relates generally to gas turbine engines, and, more specifically, to turbine cooling therein.

In a gas turbine engine air is pressurized in a compressor and mixed with fuel in a combustor for generating hot combustion gases. Multiple turbine stages follow the combustor for extracting energy from the combustion gases to power the compressor and produce useful work.

In a typical turbofan gas turbine engine configuration, a high pressure turbine (HPT) immediately follows the combustor for receiving the hottest combustion gases therefrom from which energy is extracted for powering the compressor. A low pressure turbine (LPT) follows the HPT and extracts additional energy from the combustion gases for powering a fan disposed upstream from the compressor for producing propulsion thrust for powering an aircraft in flight.

The HPT includes a turbine nozzle at the discharge end of the combustor which directs the combustion gases between first stage turbine rotor blades arranged in a row around the perimeter of a supporting rotor disk. The disk in turn is joined by a corresponding shaft to the rotor of the compressor for rotating the corresponding compressor blades therein.

The nozzle vanes and rotor blades have corresponding airfoil configurations specifically tailored for maximizing energy extraction from the hot combustion gases. The vanes and blades are hollow and include internal cooling circuits which typically use a portion of the compressor discharge pressure (CDP) air for cooling thereof. Since the nozzle vanes are stationary and the rotor blades rotate during operation, they typically have different internal cooling configurations, while similarly sharing various rows of film cooling holes through the pressure and suction sides thereof for providing external film cooling of the vanes and blades.

Any CDP air diverted from the combustion process decreases efficiency of the engine and should be minimized. However, sufficient cooling air must be used to limit the operating temperature of the vanes and blades for ensuring a suitable useful life thereof.

The turbine vanes and blades are typically manufactured from state-of-the-art superalloy materials, typically nickel or cobalt based, which have high strength at the elevated temperatures experienced in a modern gas turbine engine. The use of superalloy material and intricate cooling circuits in turbine vanes and blades helps minimize the requirement for diverting discharge air from the compressor for cooling thereof.

Furthermore, typical commercial aircraft have well defined operating cycles including takeoff, cruise, descent, and landing, with the engine being operated with a correspondingly short duration at maximum power or high turbine rotor inlet temperature.

In the continuing development of advanced gas turbine engines, it is desirable to operate the engine almost continuously at very high compressor discharge temperature and at correspondingly high turbine rotor inlet temperatures for extended periods of time for maximizing efficiency or performance. This type of engine may be used to advantage in small business jets or advanced military applications.

However, this long and hot operating condition presents extreme challenges in cooling the high pressure turbine rotor using the currently available superalloy disk materials. By operating the compressor for achieving high discharge pressure of the air used in the combustion process, the temperature of that high pressure air is correspondingly increased which decreases the ability of that CDP air to cool the high pressure turbine. Adequate cooling of the turbine is required for ensuring a long useful life thereof and reduce the need for periodic maintenance.

Accordingly, it is desired to provide a gas turbine engine having an improved cooling configuration for the high pressure turbine thereof.

BRIEF DESCRIPTION OF THE INVENTION

A turbofan engine includes in serial flow communication a first fan, second fan, multistage compressor, combustor, first turbine, second turbine, and third turbine. The first turbine is joined to the compressor by a first shaft. The second turbine is joined to the second fan by a second shaft. And, the third turbine is joined to the first fan by a third shaft. First, second, and third cooling circuits are joined to different stages of the compressor for cooling the forward and aft sides and center bore of the first turbine with different pressure air.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
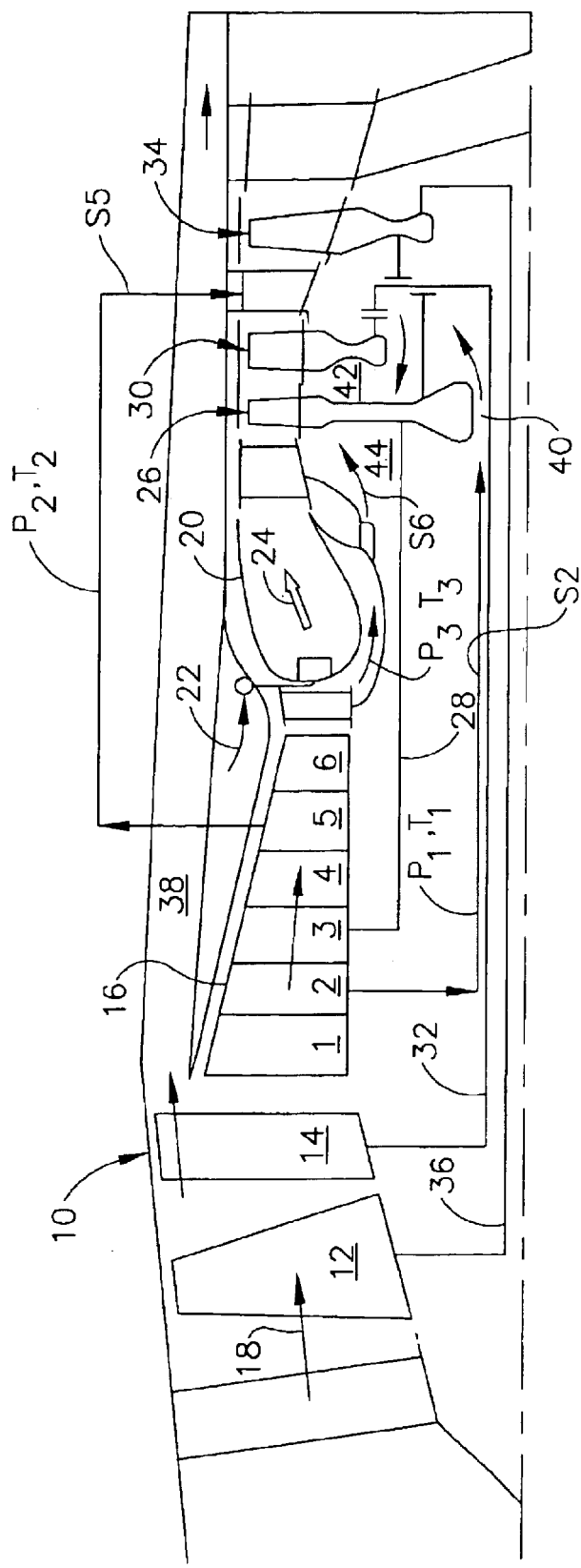
FIG. 1 is an axial schematic view of an exemplary multi-rotor turbofan aircraft engine.

Illustrated in FIG. 1 is a turbofan gas turbine engine 10 having an exemplary configuration for powering an aircraft in flight. The engine is axisymmetrical about a longitudinal or axial centerline axis and includes a first or forward fan 12, a second or aft fan 14, and a multistage axial compressor 16 joined together in serial flow communication for pressurizing air 18.

These components may have any conventional configuration, with the first and second fans including corresponding rows of fan blades extending radially outwardly from supporting rotor disks. The axial compressor includes various stages, such as the exemplary six stages 1–6 shown, including corresponding rows of rotor blades extending radially outwardly from corresponding interconnected rotor disks, cooperating with corresponding rows of stator vanes.

An annular combustor 20 is disposed at the discharge end of the compressor 16 for mixing fuel 22 with the pressurized air to form hot combustion gases 24.

A first or high pressure turbine 26 directly follows the combustor for receiving the hottest combustion gases therefrom, and is joined by a first shaft 28 to the compressor 16 for driving the rotor thereof during operation.

A second or intermediate power turbine 30 follows the first turbine 26 for receiving the combustion gases therefrom, and is joined to the second fan 14 by a second shaft 32.

A third or low pressure turbine 34 follows the second turbine 30 for receiving the combustion gases therefrom, and is joined to the first fan 12 by a third shaft 36.

The three turbines 26,30,34 are independently rotatable by their corresponding rotors or shafts 28,32,36 and define a three spool engine in which the two-stage fan 12,14 and compressor pressurize the ambient air in turn during operation. An annular bypass duct 38 surrounds the core engine aft of the two fans in a typical turbofan configuration for producing a majority of the propulsion thrust from the fan air bypassing the core engine.

In order to effectively cool the high pressure turbine 26, three independent cooling circuits 40,42,44 are used. The first cooling circuit 40 is joined to an intermediate stage, such as the second stage 2, of the compressor 16 for providing means for channeling first-pressure air S2 through the center of the turbine 26 for locally cooling this region.

The second cooling circuit 42 is joined to another intermediate stage, such as the fifth stage 5, of the compressor for providing means for channeling second-pressure air S5 to the aft or downstream side of the high pressure turbine 26.

And, the third cooling circuit 44 is joined to the discharge end of the compressor for providing means for channeling third-pressure air, which is the last or sixth stage CDP air S6 of the compressor to the upstream or forward side of the high pressure turbine 26.

The first, second, and third cooling circuits 40,42,44 are suitably joined in flow communication to sequential stages of the compressor 16 for extracting or bleeding therefrom the first-pressure air S2, the second-pressure air S5, and the third-pressure air S6 at correspondingly increasing pressure, and temperature. Both pressure and temperature of the air 18 increase as the air is pressurized through the stages of the compressor, with the second stage air having a first pressure P1 and temperature T1, the fifth stage air having a second pressure P2 and temperature T2, and the sixth stage CDP air having a third pressure P3 and temperature T3 which increase from stage to stage.

The three cooling circuits are configured for differently cooling the different portions of the high pressure turbine 26 using the different cooling capabilities of the three different temperatures associated with the three different bleed streams, and additionally using the three different pressures associated therewith in the different pressure regions of the turbine.

Figure 2:
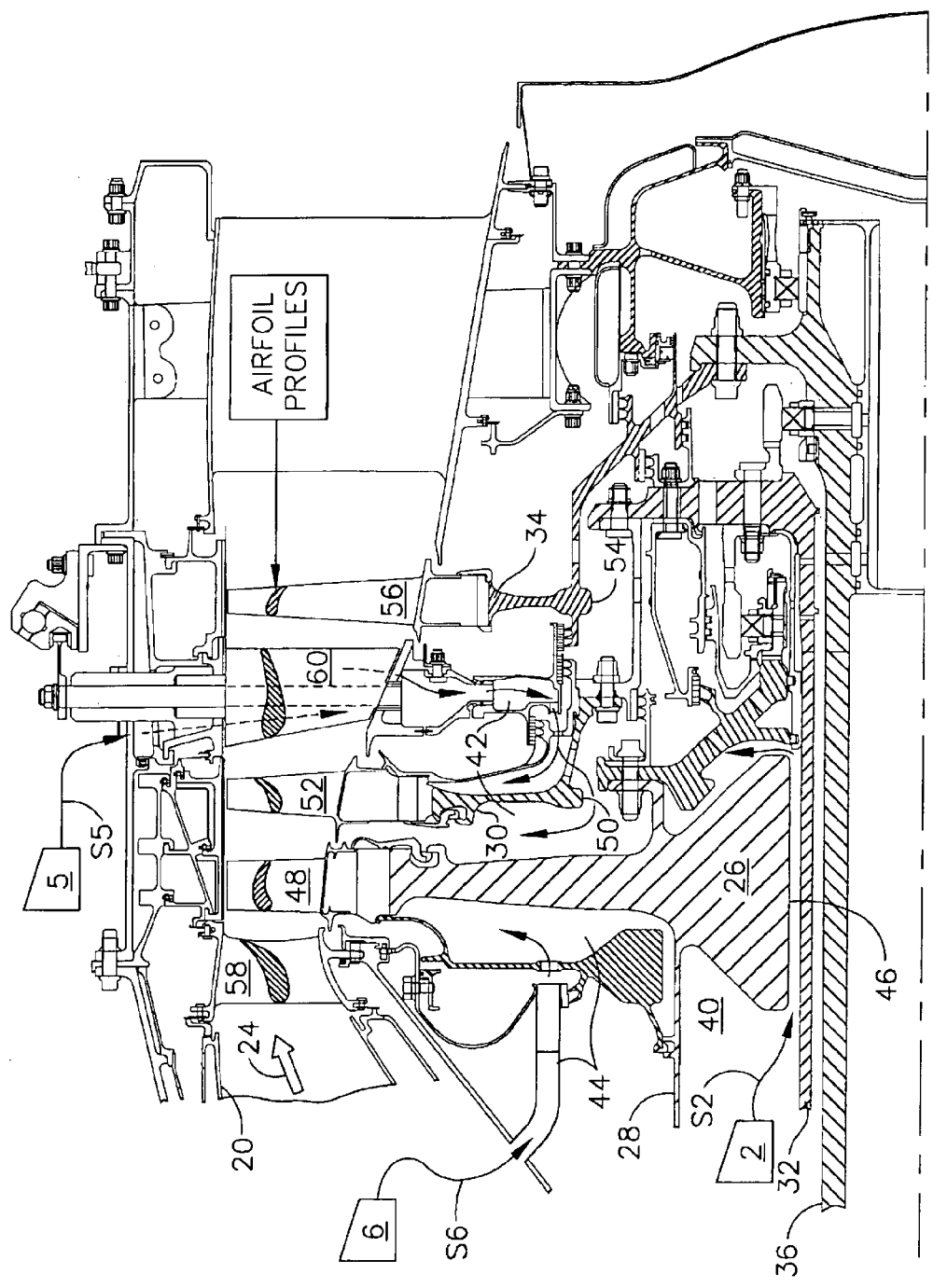
FIG. 2 is an enlarged, axial sectional view of the turbine region of the engine illustrated in FIG. 1.

More specifically, the first turbine is illustrated in more detail in FIG. 2 and comprises a first rotor disk 26 having forward and aft sides or faces extending radially inwardly from the perimeter rim to a thinner web terminating in a larger central hub. The hub includes a first center bore 46, and a row of first stage turbine rotor blades 48 extends radially outwardly from the rim of the turbine disk.

The first cooling circuit 40 is suitably configured from the compressor to extend through the bore 46 of the first turbine. The second cooling circuit 42 is suitably configured to extend radially outwardly along the aft side of the first disk 26. And, the third cooling circuit 44 is suitably configured to extend radially outwardly along the forward side of the first disk 26.

In this way, the coolest extracted air S2 is used for cooling the bore and large hub of the first turbine rotor disk 26; the next coolest extracted air S5 is used for cooling the aft face of the first turbine disk 26 below the first blades thereon; and, the highest temperature CDP air S6 is used for cooling the forward face of the first stage turbine rotor disk 26 below the blades 48 supported thereon.

Since the pressure of the combustion gases 24 decreases as energy is extracted therefrom by the first stage turbine blades 48, the different pressure cooling air is used to advantage to conform with the differential pressure acting across the first stage turbine rotor disk 26. The forward side of the first turbine disk 26 is subject to the highest pressure combustion gases, and therefore the highest pressure compressor discharge air is used in cooling this region. The aft side of the first disk 26 is subject to lower pressure, and the lower pressure bleed air may be used in cooling this region. And, the disk bore 46 may be effectively cooled with the even lower pressure of the second stage bleed air.

Like the first turbine illustrated in FIG. 2, the second turbine comprises a second rotor disk 30 having forward and aft sides, an outer rim, a thinner web, and a central hub having a second center bore 50 disposed coaxially with the first center bore 46. A row of intermediate stage second rotor blades 52 extends radially outwardly from the perimeter rim of the second turbine disk 30.

Similarly, the third turbine comprises a third rotor disk 34 having forward and aft sides, a perimeter rim, a thinner web, and a larger hub having a third center bore 54 therein disposed coaxially with the first and second bores. A row of third stage or low pressure rotor blades 56 extends radially outwardly from the perimeter rim of the third turbine rotor disk 34.

The HPT illustrated in FIG. 2 further includes a high pressure turbine nozzle 58 having a row of hollow vanes extending radially between outer and inner bands in a conventional manner. The nozzle vanes direct the combustion gases from the discharge end of the combustor to the first stage turbine rotor blades 48 which extract energy therefrom for rotating the disk 26 to drive the first shaft 28.

Similarly, the LPT includes a low pressure or third turbine nozzle 60 disposed axially between the rows of second and third stage blades 52,56 for channeling the combustion gases the LPT blades 56.

In contrast with the conventional practice of using turbine nozzles with corresponding rotor blades, the intermediate pressure turbine (IPT) is vaneless, i.e. no second turbine nozzle, with the second stage blades 52 thereof being disposed directly aft of the first stage blades 48 without a corresponding turbine nozzle therebetween. The IPT blades 52 then discharge the combustion gases to the LPT nozzle 60.

This permits the second cooling circuit 42 to extend radially inwardly through the third nozzle 60, axially forward through the second bore 50, and axially between the aft and forward opposing sides of the first and second stage disks 26 and 30. Pressure losses in the second cooling circuit 42 are therefore reduced, and the fifth stage cooling air may be effectively used for directly cooling the aft side of the first turbine disk 26.

Figure 3:
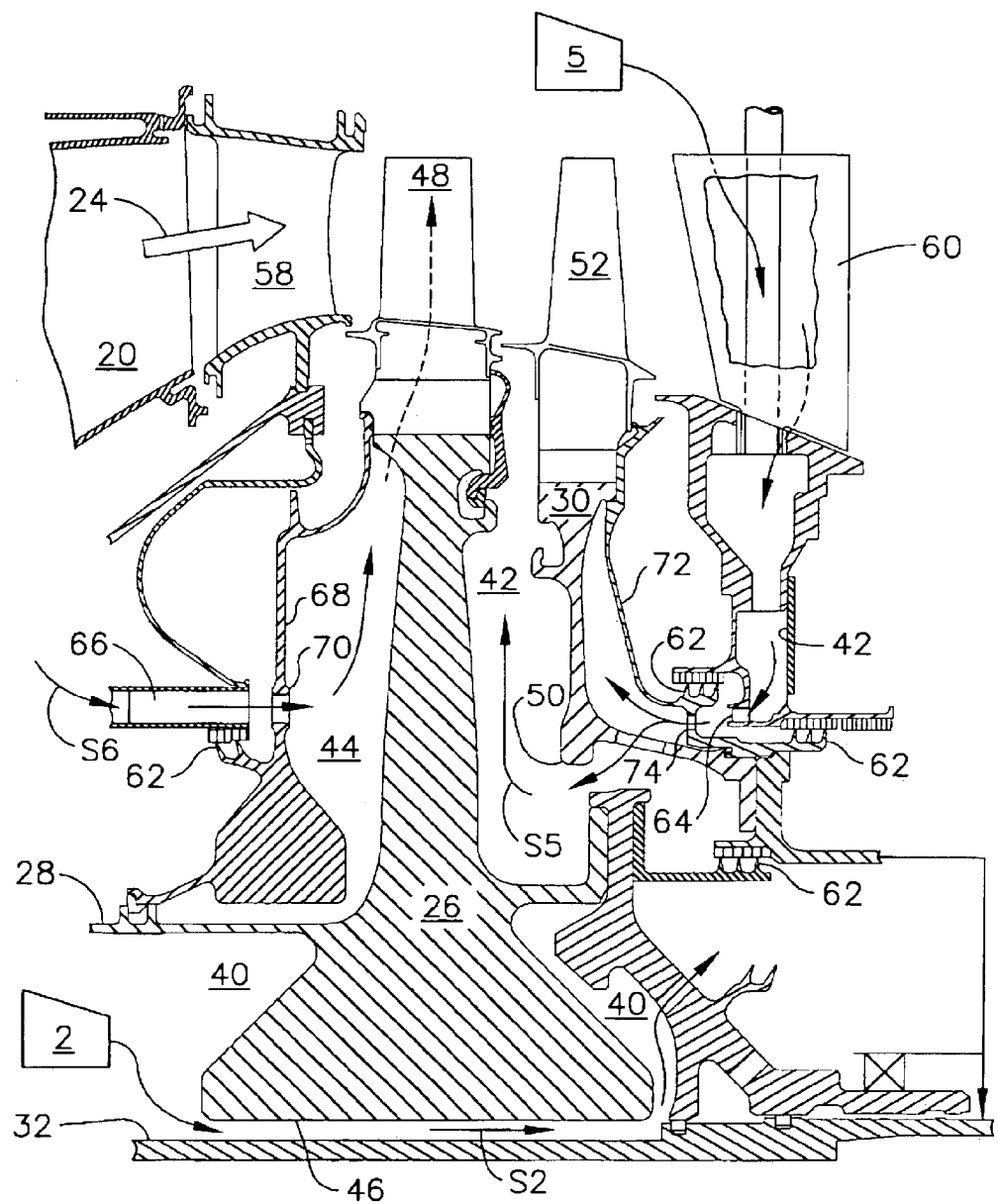
FIG. 3 is a further enlarged, axial sectional view of the turbine region illustrated in FIG. 2.

As illustrated in further enlarged view in FIG. 3, the second cooling circuit 42 is defined by various stator and rotary components, and includes a portion radially split or bifurcated by the aft blade retainer 72 to flow in part through the second bore 50 and in remaining part along the aft side of the second disk 30. In this way, the fifth stage air is used to cool both sides of the second disk 30, as well as cooling the aft side of the first disk 26.

The three cooling circuits 40,42,44 may be suitably configured using various elements conventionally available in turbofan engines, including corresponding seals 62, such as labyrinth seals, to isolate the circuits from each other, while also isolating the forward and aft sides of the first turbine disk 26 from the first bore 46 thereof for providing cooling of the different portions of the first disk 26 with different temperature cooling air.

Since the various components of the turbines include rotary and stationary components, the second cooling circuit 42 illustrated in FIG. 3 preferably includes a stationary second inducer 64 in the form of tangentially inclined vanes or apertures for tangentially accelerating the fifth stage air circumferentially around the second rotor disk 30 for minimizing aerodynamic losses therebetween.

Similarly, the third cooling circuit 44 includes a stationary third inducer 66 having inclined vanes or apertures for tangentially accelerating the sixth stage air circumferentially around the first turbine disk 26 for minimizing aerodynamic losses. The inducers 64,66 may have any conventional configuration specifically configured for cooperating in the manner disclosed above.

The first turbine illustrated in FIG. 3 further includes a forward blade retainer 68 in the form of a disk spaced forward in most part from the first disk 26. The outer end of the blade retainer 68 retains the first stage blades 48 in the rotor disk in a conventional manner, and the inner end of the blade retainer includes a row of axial apertures 70 aligned with the third inducer 66 for receiving the sixth stage air therefrom.

Similarly, the second turbine further includes an aft blade retainer 72 in the form of an annular plate spaced in part axially aft from the second disk 30. The outer end of the retainer 72 retains the second stage blades 52 in the second disk in a conventional manner. And, the inner end of the retainer 72 includes a row of axial apertures 74 aligned with the second inducer 64 for receiving the fifth stage air therefrom.

The retainers 68,72 define in part the discharge ends of the corresponding cooling circuits for cooling the respective sides of the two disks 26,30 using the different temperature bleed air, while accelerating the bleed air from the stationary inducers to the rotating rotors Correspondingly, the first cooling circuit 40 illustrated in FIG. 3 is defined in aft part by the first shaft 28 being hollow or cylindrical through which the second stage air may be channeled from the compressor. The first shaft 28 extends in opposite directions from the forward and aft sides of the first turbine disk 26 at the junction between the thin web and thicker hub thereof for surrounding the thicker hub with the low temperature second stage bleed air being channeled through the first circuit 40. In this way, low temperature air cools the large hub of the first disk 26; and the opposite sides of the thin web thereof are cooled by the different temperature fifth and sixth stage bleed air.

FIG. 2 illustrates schematically exemplary profiles of the various airfoils defining the nozzle vanes and turbine blades. In the preferred embodiment illustrated, the first and second rotor blades 48,52 are configured oppositely in aerodynamic profile for rotating the second shaft 32 in counterrotation with the first shaft 28, without a turbine nozzle between these two turbine stages. And, the aerodynamic profile of the third rotor blades 56 can be opposite to the second blades 52 for counterrotation therewith.

Correspondingly, the third turbine nozzle includes variable position or variable area nozzle vanes 60 having spindles extending radially therethrough joined to suitable means for rotating the spindles and vanes for adjusting the variable area of the turbine nozzle. Any conventional configuration may be used in the variable area nozzle.

The nozzle vanes 60 are preferably hollow, and the second cooling circuit 42 extends through the hollow vanes to the second bore 50, and is defined in part by corresponding channel walls.

As illustrated in FIG. 2, the three turbine disks 26,30,34 are suitably mounted in the engine using corresponding supports, bearings, and frames. As indicated above, the second shaft 32 rotates in counterrotation with the first shaft 28, and the third shaft 36 rotates in counterrotation with the second shaft 32 and in co-rotation with the first shaft 28. Accordingly, various seals are provided between the various portions of the three shafts for separating the three cooling circuits from each other, as well as for separating oil circuits provided for feeding the bearings.

Notwithstanding the complexity of mounting the three rotor shafts illustrated in FIG. 2, the three independent cooling circuits may be introduced into the various components thereof for cooling the high pressure turbine disk 26 with the three different temperature bleed airstreams for enhancing the cooling thereof. The sixth stage CDP air which is initially channeled through the third cooling circuit 44 to cool the forward face of the turbine disk 26, is then discharged through the first stage blades 48 themselves in any conventional manner for cooling thereof.

The fifth stage air which cools the aft side of the first turbine disk 26 returns to the turbine flowpath. And, the second stage air which cools the hub and bore of the first turbine disk 26 is discharged therefrom to purge the various bearing cavities.

Accordingly, using this improved cooling configuration for the first stage turbine of the three-spool turbofan engine in conjunction with modem superalloy materials for the turbine components, permits the use of higher pressure compressor discharge air and higher turbine rotor inlet temperature for operation of the engine for extended duration while maintaining a correspondingly long useful life of the engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

What is claimed is:

1. A turbofan engine comprising:
    a first fan, a second fan, and a multistage compressor joined in serial flow communication for pressurizing air;
    a combustor disposed at a discharge end of said compressor for mixing fuel with said pressurized air to form combustion gases;
    a first turbine following said combustor and joined by a first shaft to said compressor;
    a second turbine following said first turbine and joined to said second fan by a second shaft;
    a third turbine following said second turbine and joined to said first fan by a third shaft;
    a first cooling circuit joined to an intermediate stage of said compressor for channeling first-pressure air through the center of said first turbine;
    a second cooling circuit joined to another intermediate stage of said compressor for channeling second-pressure air to the aft side of said first turbine;
    a third cooling circuit joined to said discharge end of said compressor for channeling third-pressure air to the forward side of said first turbine; and wherein said first, second, and third cooling circuits are joined to sequential stages of said compressor for extracting therefrom said first-pressure air, said second-pressure air, and said third-pressure air at correspondingly increasing pressure and temperature.

2. An engine according to claim 1 wherein:
said second turbine comprises a second rotor disk having a second center bore and a row of second rotor blades extending radially outwardly from a perimeter rim thereof;
said third turbine comprises a third rotor disk having a third center bore and a row of third rotor blades extending radially outwardly from a perimeter rim thereof, and a third turbine nozzle disposed between said second and third blades;
said second blades are disposed aft of said first blades without a turbine nozzle therebetween; and
said second cooling circuit extends radially inwardly through said third nozzle, axially forward through said second bore, and between the opposing sides of said first and second disks.

3. An engine according to claim 2 wherein said third turbine nozzle includes variable position hollow vanes, and said cooling circuit extends through said vanes to said second bore.

4. An engine according to claim 3 wherein:
said first turbine comprises a first rotor disk having a first center bore and a row of first rotor blades extending radially outwardly from a perimeter rim thereof; and
said first cooling circuit extends through said first bore, said second cooling circuit extends radially outwardly along the aft side of said first disk, and said third circuit extends radially outwardly along the forward side of said first disk.

5. An engine according to claim 4 wherein said second cooling circuit is radially split to flow in part through said second bore and in remaining part along the aft side of said second disk.

6. An engine according to claim 5 wherein:
said second cooling circuit includes a stationary second inducer for tangentially accelerating said second-pressure air around said second rotor disk; and
said third cooling circuit includes a stationary third inducer for tangentially accelerating said third-pressure air around said first rotor disk.

7. An engine according to claim 6 wherein:
said first turbine further includes a forward blade retainer spaced in part from said first disk, and having a row of apertures aligned with said third inducer for receiving said third-pressure air therefrom; and
said second turbine further includes an aft blade retainer spaced in part from said second disk, and having a row of apertures aligned with said second inducer for receiving said second-pressure air therefrom.

8. An engine according to claim 6 wherein:
said first turbine disk further includes a thin web extending radially inwardly from said rim followed by a thicker hub containing said first center bore; and
said first shaft is hollow and extends from said forward and aft sides of said first turbine disk between said web and hub thereof to define in part said first cooling circuit for cooling said first turbine hub.

9. An engine according to claim 6 wherein said first and second rotor blades are oppositely configured for rotating said second shaft in counterrotation with said first shaft.

10. An engine according to claim 6 wherein each of said first, second, and third cooling circuits includes corresponding seals to isolate from each other said forward side, aft side, and first bore of said first turbine disk and provide cooling thereof with different temperature cooling air.

11. A turbofan engine comprising:
a first fan, a second fan, and a multistage compressor joined in serial flow communication for pressurizing air;
a combustor disposed at a discharge end of said compressor for mixing fuel with said pressurized air to form combustion gases;
a first turbine following said combustor and joined by a first shaft to said compressor;
a second turbine following said first turbine and joined to said second fan by a second shaft;
a third turbine following said second turbine and joined to said first fan by a third shaft;
a first cooling circuit joined to an intermediate stage of said compressor for channeling first-pressure air through the center of said first turbine;
a second cooling circuit joined to another intermediate stage of said compressor for channeling second-pressure air to the aft side of said first turbine; and
a third cooling circuit joined to said discharge end of said compressor for channeling third-pressure air to the forward side of said first turbine.

12. An engine according to claim 11 wherein:
said first turbine comprises a first rotor disk having a first center bore and a row of first rotor blades extending radially outwardly from a perimeter rim thereof; and
said first cooling circuit extends through said bore, said second cooling circuit extends radially outwardly along the aft side of said disk, and said third circuit extends radially outwardly along the forward side of said disk.

13. An engine according to claim 12 wherein:
said second turbine comprises a second rotor disk having a second center bore and a row of second rotor blades extending radially outwardly from a perimeter rim thereof;
said third turbine comprises a third rotor disk having a third center bore and a row of third rotor blades extending radially outwardly from a perimeter rim thereof, and a third turbine nozzle disposed between said second and third blades;
said second blades are disposed aft of said first blades without a turbine nozzle therebetween; and
said second cooling circuit extends radially inwardly through said third nozzle, axially forward through said second bore, and between the opposing sides of said first and second disks.

14. An engine according to claim 13 wherein said second cooling circuit is radially split to flow in part through said second bore and in remaining part along the aft side of said second disk.

15. An engine according to claim 13 wherein:
said second cooling circuit includes a stationary second inducer for tangentially accelerating said second-pressure air around said second rotor disk; and
said third cooling circuit includes a stationary third inducer for tangentially accelerating said third-pressure air around said first rotor disk.

16. An engine according to claim 15 wherein:
said first turbine further includes a forward blade retainer spaced in part from said first disk, and having a row of apertures aligned with said third inducer for receiving said third-pressure air therefrom; and said second turbine further includes an aft blade retainer spaced in part from said second disk, and having a row of apertures aligned with said second inducer for receiving said second-pressure air therefrom.

17. An engine according to claim 16 wherein:

said first turbine disk further includes a thin web extending radially inwardly from said rim followed by a thicker hub containing said first center bore; and said first shaft is hollow and extends from said forward and aft sides of said first turbine disk between said web and hub thereof to define in part said first cooling circuit for cooling said first turbine hub.

18. An engine according to claim 13 wherein said first and second rotor blades are oppositely configured for rotating said second shaft in counterrotation with said first shaft.

19. An engine according to claim 18 wherein said third turbine nozzle includes variable position hollow vanes, and said cooling circuit extends through said vanes to said second bore.

20. An engine according to claim 13 wherein said first, second, and third cooling circuits are joined to sequential stages of said compressor for extracting therefrom said first-pressure air, said second-pressure air, and said third-pressure air at correspondingly increasing pressure and temperature.

* * * * *